Oct. 11, 1949.　　　　　E. J. COOK　　　　　2,484,448
MICROPHOTOGRAPHIC APPARATUS
Filed May 13, 1946　　　　　　　　　　　　　　　4 Sheets-Sheet 1
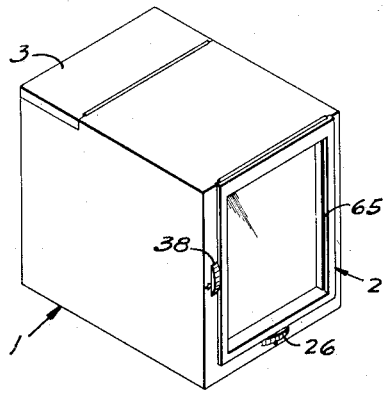
Fig. I
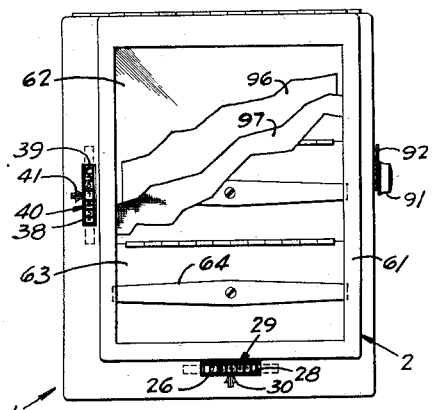
Fig. II
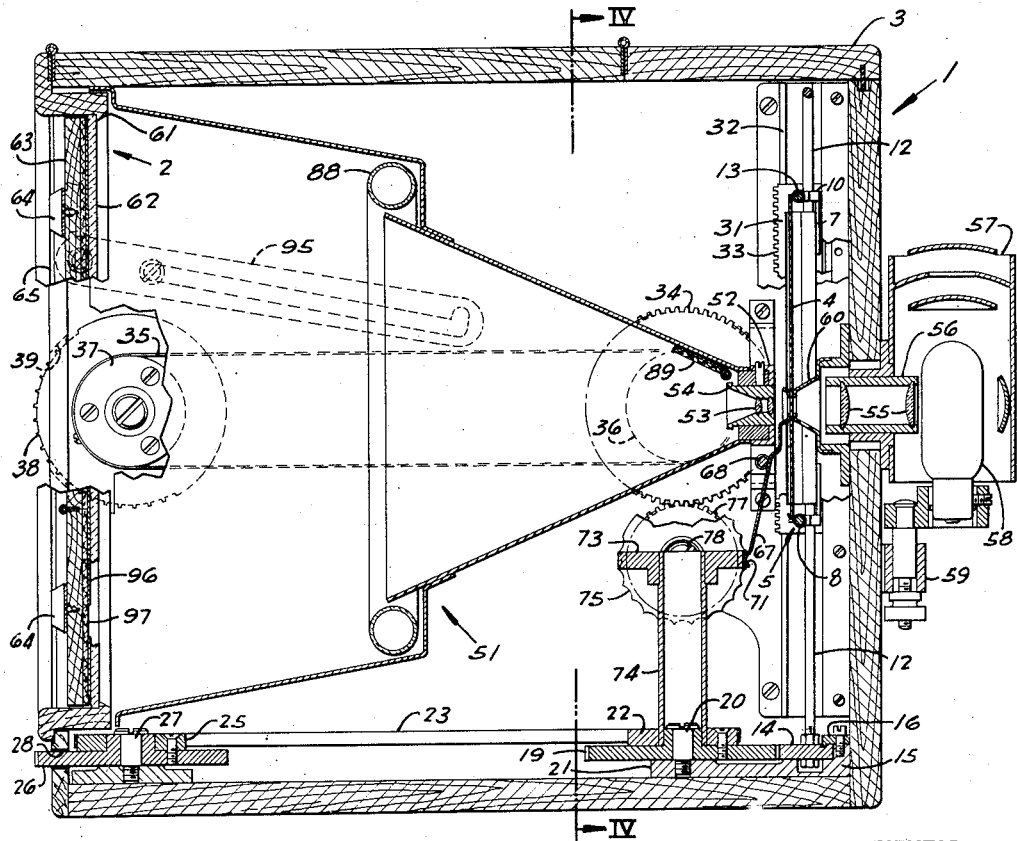
Fig. III
INVENTOR.
Everett J. Cook
BY
Marshall and Marshall
ATTORNEYS

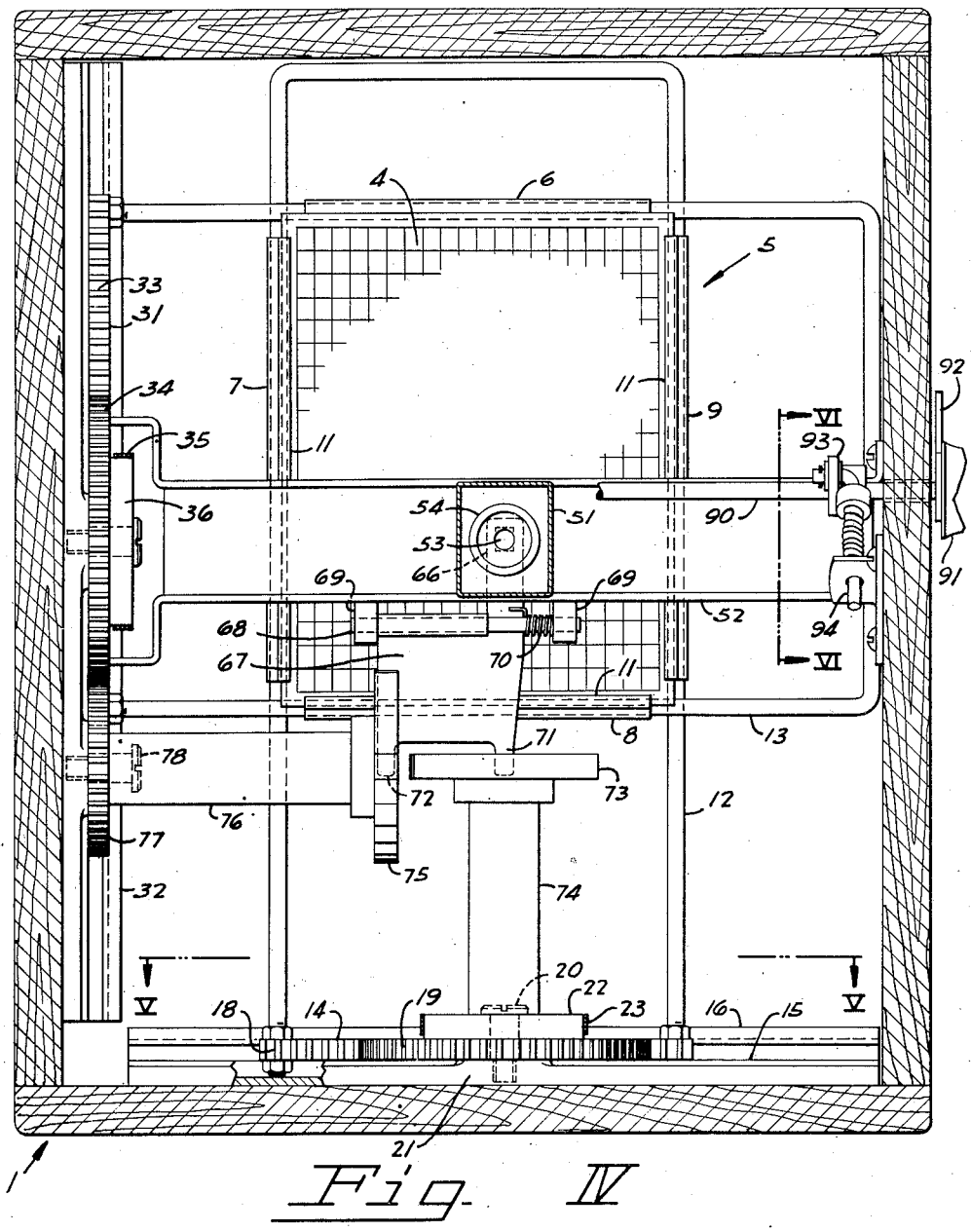

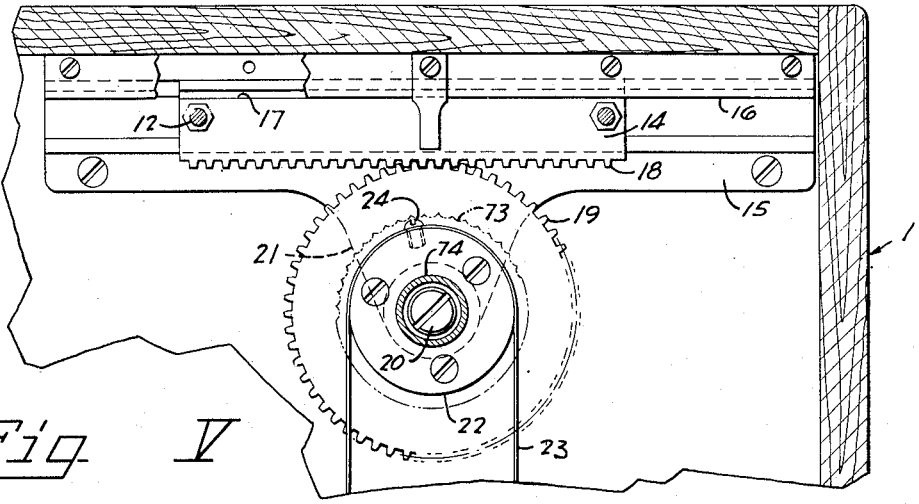
_Fig. V_
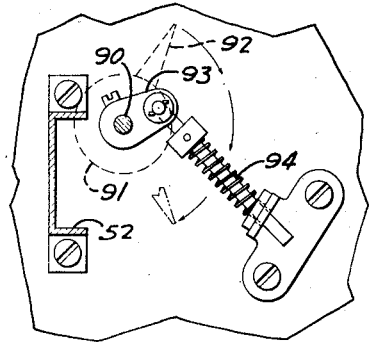
_Fig. VI_
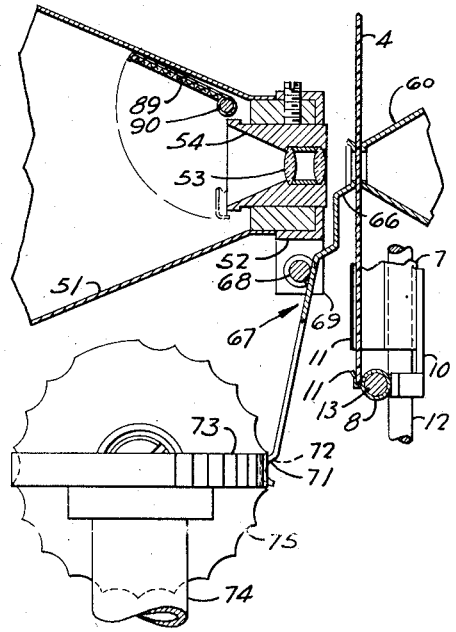
_Fig. VII_
INVENTOR.
Everett J. Cook
BY
Marshall and Marshall
ATTORNEYS Oct. 11, 1949.  E. J. COOK  2,484,448
MICROPHOTOGRAPHIC APPARATUS
Filed May 13, 1946  4 Sheets-Sheet 4
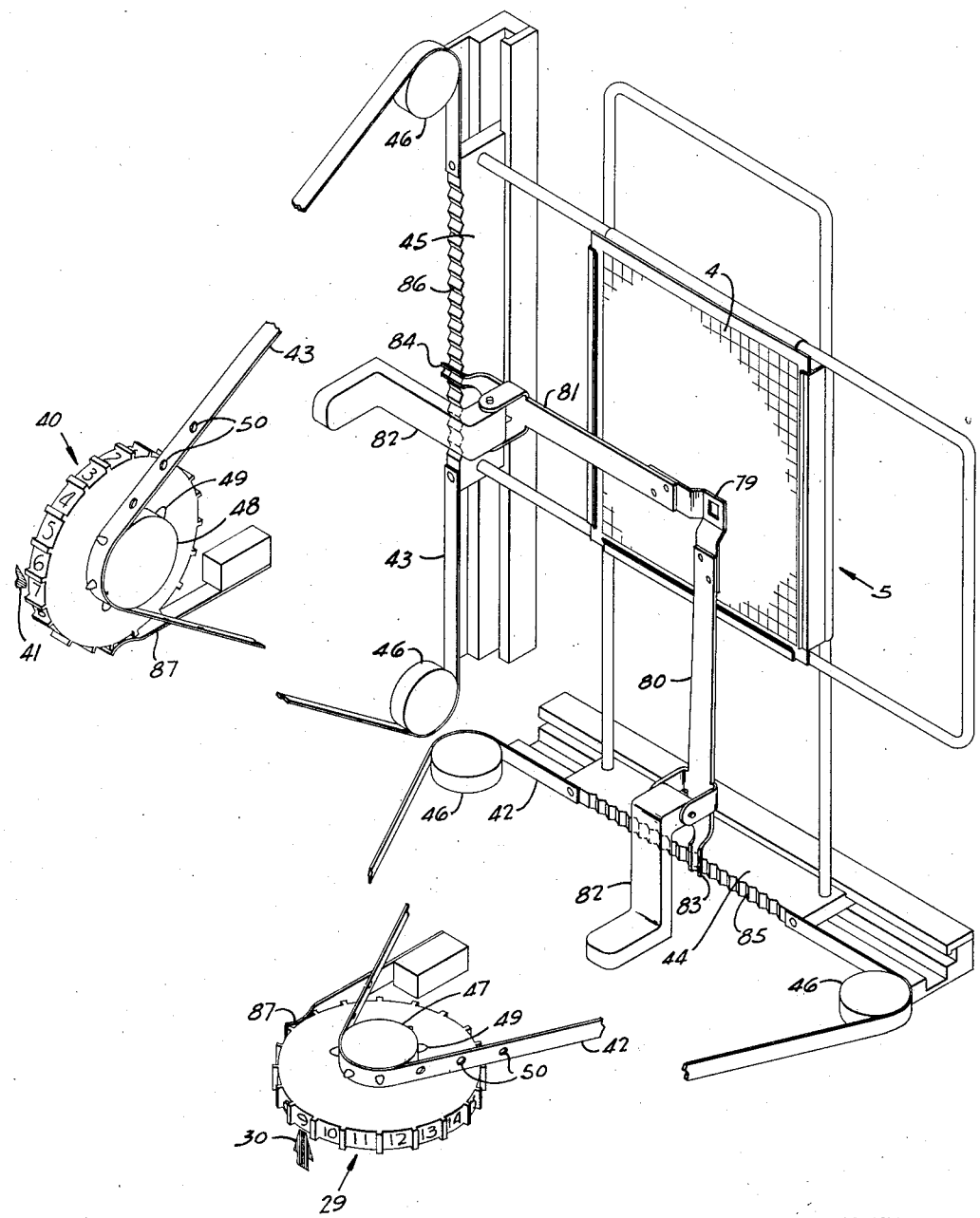
Fig. VIII
INVENTOR.
Everett J. Cook
BY
Marshall and Marshall
ATTORNEYS Patented Oct. 11, 1949

2,484,448

UNITED STATES PATENT OFFICE 2,484,448

MICROPHOTOGRAPHIC APPARATUS

Everett J. Cook, Toledo, Ohio

Application May 13, 1946, Serial No. 669,399

4 Claims. (Cl. 88—24)

This invention relates to microphotographic apparatus.

Various styles of cameras and projecting equipment have been developed whose principal purpose is the photographic recording of data in condensed form so as to reduce the space necessary for its filing or storage and yet to enable the enlargement of the data thus recorded to readily visible size. The best known machines of this type are those which employ 35 mm. strip film, with each frame of the film used to record, for example a different letter, bill, invoice, or other record, or a successive page of a standard reference work or a different drawing or any other data of which it is desired to keep a permanent record.

When this type of film is employed for the recording of individual items, it is often necessary to run through a considerable length of the film in order to find and examine or reproduce the particular item to which reference is desired.

Another difficulty with the continuous strip film when employed for data recording purposes lies in the fact that in order to insert additional items into the alphabetical or numerical series, for example, it is necessary to cut and resplice the film and there is no way of indexing the material so that the newly inserted material quickly can be found.

It is an object of this invention to provide an apparatus for the recording of data or reference works photographically in such a manner that they can be accurately indexed for rapid reference when desired.

It is a further object of this invention to provide an apparatus which can be used for photographically recording data and also for reproducing data to its original size or for viewing such data without reproduction.

It is another object of this invention to provide an apparatus for photographically recording reference material on standard size films with accurate and simple indexing means.

It is a further object of this invention to provide an apparatus designed to permit the photographic recording of reference material in greatly reduced size so that a large number of different items can be recorded on a single standard sized film and the group of references included on each film as well as each reference within the group, adequately indexed for quick and accurate reference.

It is a still further object of this invention to provide an apparatus which will permit the rapid location of a desired reference item and its viewing or reproduction at will without any modification in the apparatus or without requiring the use of additional apparatus.

It is yet another object of this invention to provide a single apparatus in which the functions of photographic reduction, photographic reproduction and viewing of reference material are combined so that through the use of the one machine it is possible to perform all operations except the chemical steps, which are required for the microphotographic system of reference recording.

This invention consists in an apparatus for indexing sheets of film in an optical system provided with means for employing the system either to enlarge or reduce images of the reference material being handled.

In the drawings:

Figure I is an isometric view of a microphotographic apparatus embodying the invention.

Figure II is a front view in elevation on a slightly enlarged scale of the device shown in Figure I, certain parts being broken away.

Figure III is a vertical sectional view of the apparatus embodying the invention and shown on a further enlarged scale.

Figure IV is a still further enlarged view, partly in section and partly in elevation and taken substantially from the position indicated by the line IV—IV of Figure III.

Figure V is a fragmentary detailed view taken substantially from the position indicated by the line V—V of Figure IV.

Figure VI is a fragmentary detailed view taken substantially from the position indicated by the line VI—VI of Figure IV.

Figure VII is a still further enlarged fragmentary view in section of a portion of the mechanism illustrated in Figure III.

Figure VIII is an isometric view somewhat schematic in nature of an alternative form of construction of certain parts of an apparatus embodying the invention.

A microphotographic apparatus embodying the instant invention can be most easily mounted in a rectangular housing 1 which has a hinged frame 2 at its forward end and a door 3 at its upper rear. The door 3 gives access to the interior of the housing 1 for the insertion and removal of sheets of film which may be of any desired size. Such a film 4 which is illustrated in the drawings has been arbitrarily shown as being four inches by five inches in size. The film 4 is carried by an open frame 5 which comprises four tubular members 6, 7, 8 and 9 which are joined at each of their corners (see also Figure VII) by an angle brace 10 which has offset arms. The sleeves 7, 8 and 9 each carry a clip 11 which with the body of its respective sleeve forms a slide into which the film 4 is inserted.

The frame 5 is supported by a pair of U-shaped guides 12 and 13 which are associated with the sleeves 7 and 9 and 6 and 8 respectively. The guide 12 is erected on a slide 14 (see also Figure V) which is horizontally slidable in a way 15 that extends transversely across the rear of the housing 1 and is secured thereto. The slide 14 is held on the way 15 by a retainer 16 secured to the way 15 and extending into a groove 17 cut in the top of the slide 14. A rack 18 is cut in the front edge of the slide 14 and is in mesh with a driving gear 19. The gear 19 is rotatably journaled on a stud 20 which is secured in an ear 21 located on the front of the way 15. A pulley 22 is mounted upon the gear 19 and concentrically secured thereto. The pulley 22 is rotated by a drive ribbon 23 which is fixed to the pulley 22 by a screw 24 (Figure V) and which also is secured to a similar pulley 25 (Figure III) mounted on and rotatable with a hand wheel 26 located near the front of the housing 1. The hand wheel 26 is journaled on a stud 27 and extends through a slot 28 in the front wall of the housing 1 below the hinged frame 2 so that it can be manually operated to rotate by means of the ribbon 23, the gear 19 and move the slide 14 back and forth across the apparatus. The ribbon 23 being secured to the pulleys 22 and 25 insures a positive drive between the hand wheel 26 and the slide 14. The entire movement of the slide 14 is effected by rotation of approximately 180° of the hand wheel 26 and the two pulleys 22 and 25.

The hand wheel 26 has a series of indicia 29 (Figures II and VIII) which cooperate with an index 30 to show the position of the guide 12 and the film 4 horizontally.

The guide 13 is mounted in a vertically movable slide 31 which is similar to the slide 14 and is similarly mounted in a vertical way 32 secured to the left side of the housing 1. The slide 31 has a rack 33 cut in its front edge which is in mesh with a drive gear 34 and driven by a ribbon 35 fixed to a pair of pulleys 36 and 37. The pulley 36 is attached to the gear 34 and the pulley 37 is attached to a hand wheel 38 journaled similarly to the hand wheel 36 and extending through a slot 39 in the front wall of the housing 1 of the left side of the frame 2. A series of indicia 40 is secured on the periphery of the hand wheel 38 and cooperates with an index 41 to show the vertical position of the guide 13 on the frame 5 and the film 4 carried thereby.

Thus, by turning the hand wheels 26 and 38 the guides 12 and 13 are moved horizontally or vertically as the case may be and the frame 5 is slid in the corresponding direction thus indexing the film 4 to the positions indicated by the indexes 30 and 41 and the indicia 29 and 40. The construction just described is designed for use with a film measuring four inches by five inches and divided into twenty rows of twenty frames each or a total of four hundred frames per film. Therefore, there are twenty numbers in each series of indicia and twenty horizontal and twenty vertical positions.

Figure VIII illustrates a modification of the indexing means just described in which a drive ribbon 42 (similar to the drive ribbon 23) and a drive ribbon 43 (similar to the drive ribbon 35) are attached directly to their respective slides 44 and 45. In this modification each of the drive ribbons 42 and 43 passes over a pair of idler pulleys 46 and is connected to its respective driving pulley 47 or 48 by a series of pins 49 in the periphery of the pulley which cooperate with a series of holes 50 punched in the driving ribbon 42 or 43. This construction eliminates the racks and gears shown in the first modification but otherwise operates identically with such first modification.

The optical system of the apparatus constituting the instant invention consists of a rectangular funnel 51 (Figure III) which at its open forward end is equal in area to the frame 2 and embraces such frame. The rear end of the funnel 51 is substantially smaller in size and is secured to a transverse frame 52 which extends across the housing 1 near its rear. A pair of projection lenses 53 are mounted in a cell 54 which is movable on the optical axis of the lenses 53 forwardly and rearwardly. A pair of condensing lenses 55 are mounted in a lens tube 56 coaxially with the lenses 53 and extending through the rear wall of the housing 1. A lamp housing 57 is mounted on the rear exterior of the housing 1. A projection lamp 58 is supported within the housing 57 by an adjustable lamp bracket 59. The lens tube 56 leads from the interior of the lamp housing 57 into the interior of the housing 1 and its forward end is enclosed by a funnel 60 (see also Figure VII) having an open rectangular front end the size of one of the frames on the film 4. The funnel 60 thus acts as a framing device for the projection system. The condensing lenses 55, the open forward end of the funnel 60, and the projection lenses 53 all have a common optical axis.

The hinged frame 2 which forms the front closure of the housing 1 consists of a rectangular frame 61 in which may be mounted a sheet of glass 62 and a three-section cover 63 which has spring latches 64 engageable with slots 65 cut in the frame 61 to hold the cover 63 in place.

A presser foot 66 is provided to hold the film 4 in the projection plane of the lens system of the apparatus. The presser foot 66 has a rectangular opening the same size and in line with the open forward end of the funnel 60. The presser foot 66 is one arm of a bracket 67 which is swiveled on a pin 68 mounted in two lugs 69 formed on the lower side of the transverse frame 52. A spring 70 is coiled around the pin 68 and urges the presser foot 66 against the film 4. At the lowermost end of the bracket 67 there is formed a pair of detents 71 and 72. The detent 71 is pressed against the periphery of a ratchet wheel 73 which is mounted on the upper end of a tubular shaft 74 the lower end of which is secured to and rotatable with the pulley 22 and gear 19. Thus, when the hand wheel 26 is turned and the slide 14 and its guide 12 moved across the apparatus, the detent 71 is swung back and forth by the periphery of the ratchet wheel 73 to disengage the presser foot 66 from the film 4 when the film 4 is moving and to reengage the presser foot after the film has been moved to its new position. Because of the scallop-like periphery of the ratchet wheel 73 the horizontal motion takes place in short steps rather than in one smooth movement and thus, the presser foot is disengaged each time that the film is moved.

The other detent 72 is engaged with a ratchet wheel 75 which is mounted on a horizontal tubular shaft 76 secured to the hub of a pinion 77 journaled on the side wall of the housing 1 by a stud 78 and in mesh with the vertical movement drive gear 34. Thus, when the vertical movement hand wheel 38 is rotated the presser foot 66 is swung away from the film just as it is when the horizontal hand wheel is rotated. If it is desired to move the film 4 in its frame rapidly either in the vertical or horizontal direction, one of the hand wheels 26 or 38 may be moved a half step which will disengage the presser foot 66 from the film permitting it to be rapidly traversed with the other hand wheel in the desired direction.

In the modification of the construction shown in Figure VIII, a presser foot 79, which is similar in purpose to the presser foot 66, is mounted on the ends of two arms 80 and 81 which are hinged on brackets 82 from the bottom and side of the housing 1 respectively. The other end of the arms 80 and 81 are formed into detents 83 and 84 each of which is engaged with a series of teeth 85 or 86 cut in the front edges of the slides 44 and 45 respectively. Since the presser foot 79 is attached to both of the arms 80 and 81 movement of either of them swings it away from the film 4 and one of them moves each time one of the hand wheels is rotated. In order to positively position the hand wheels with respect to the film frame 5 they are equipped with detents 87 which engage their peripheries to cause their rotation in steps, and to hold the detents 83 and 84 on the crests of the teeth 85 and 86.

The funnel 51 which might be called the bellows of the apparatus is offset about half way between the front and back and in the offset there is located a tubular lamp 88 (Figure III) which serves to brilliantly illuminate the forward end of the funnel 51 and any reference material which may be held against the glass 62 to be photographed. When the device is to be employed as a reduction camera it is necessary to prevent any light which is reflected from the reference material being photographed from entering the lens cell 54 and fogging the film while it is being moved from one frame to a successive frame. This is accomplished by means of a shutter 89 (Figures III and VII) which is secured on the end of a shaft 90 extending horizontally into the housing 1 and funnel 51. A shutter actuating knob 91 and indicator 92 is mounted on the exterior end of the shaft 90. An overcenter device comprising a crank 93 and resiliently extending rod 94 is secured to the shaft 90 to insure its being either entirely open or tightly shut. The shutter 89 is lined with a light trapping material such as felt.

The operation of an apparatus as a camera will now be described. The frame 2 is swung forwardly and upwardly into horizontal position (it is hinged along its upper horizontal edge) and held there by a latch 95 (Figure III). A letter or other reference material to be reproduced (indicated by the numeral 96 in Figure II) is laid on the glass 62 and covered by the three-section cover 63 which has an inner lining of, for example, felt 97. The latches 64 are engaged in their slots 65 and the frame 2 swung back down into its closed position. A fresh unexposed sheet of film is then inserted through the door 3 into the film frame 5 and the shutter 89 is closed. The film is then indexed by the hand wheels 26 and 38 to, for example, position 1—1, first frame of the first row. The lamp 88 is illuminated and the shutter 89 opened for a sufficient length of time to properly expose the film. A second reference is inserted in the frame 2. The film indexed to the second position, for example 2—1, second frame of the first row and the second exposure made. This is continued until all of the reference material has been photographed, changing the films as necessary and recording on each of the reference data or an auxiliary index the position on the film and the film number where each of the reference materials has been photographed. In this manner at the rate of four hundred sheets per film, large voluminous files and references may be recorded in minute easily locatable form.

When it is desired to use the apparatus for reference the location of the desired data is found in an auxiliary index and the particular film containing the data is inserted through the door 3 into the film frame 5. When used in this manner the three-part cover 63 and its film lining are laid aside and the glass 63 is replaced with a sheet of frosted glass. The film is then indexed by the hand wheels 26 and 38 to the desired frame, for example 14—19, i. e. the fourteenth frame and the nineteenth row. The projection lamp 58 is then illuminated and the film projected onto the ground glass screen where it can be studied as desired.

If it is desired to make reproductions of any of the reference material which has been located it only is necessary to re-insert the clear glass 62 and place a sheet of sensitized paper thereon holding it in place with the three-part cover 63. The projection lamp 58 can then be illuminated for a period of time to expose the sensitized paper and the paper can then be developed to provide a reproduction of the material recorded in substantially its original size.

The embodiments of the invention which have been described may be modified to meet various requirements.

Having described the invention, I claim:

1. In a microphotographic device having an optical system with a fixed axis, multiple-frame-film holding and indexing mechanism comprising, in combination, a combination presser and single-frame mask centered on the axis of said optical system on an image plane thereof, an open, frame-like film holder, the area of the film held therein being a predetermined whole multiple of the area of a single frame, a pair of vertically extending horizontally translatable guides slidably engaged with the vertical edges of said film holder, a pair of horizontally extending vertically translatable guides slidably engaged with the horizontal edges of said film holder, separate independent manually operable means for selectively positioning said film holder horizontally and vertically relative to the axis of the optical system, movable ratchet means actuated by said manually operable means for providing a series of stops corresponding to the number of frames horizontally and vertically, respectively, on a film in said film holder and stop means engaging said ratchet means and carrying said combination presser and mask, whereby engagement of said stop means with said ratchet means at any stop position on said ratchet means moves said combination presser and mask against said film.

2. Indexing mechanism for a microphotographic device having a fixed axis optical system and a multiple-frame-film holding device movable horizontally and vertically in a plane perpendicular to the axis of the optical system comprising, in combination, separate manually operable means for selectively positioning said film holder horizontally and vertically relative to the axis of the optical system, a movable ratchet means for each of said manually operable means for providing a series of stops corresponding to the number of frames horizontally and vertically, respectively, on a film in said film holder, a combination presser and single-frame mask, and stop means engaging said ratchet means and carrying said combination presser and mask, whereby engagement of said stop means with said ratchet means at any stop position on said ratchet means moves said combination presser and mask against said film.

3. In a microphotographic device having a fixed axis optical system, a multiple-frame sheet film holder movable horizontally and vertically on an image plane of the optical system and separate manually operable means for securing movement of said holder in each direction, in combination, an indexing mechanism for said film holder comprising, a manually operable control having a frame index for moving said film holder horizontally, a second manually operable control having a frame index for moving said film holder vertically, ratchet means associated with each of said manually operable means for providing a series of stops corresponding in spacing to the horizontal and vertical dimensions, respectively, of a single frame, a combination presser and single-frame mask centered on the optical axis, stop means engaging said ratchet means and carrying said combination presser and mask, whereby engagement of said stop means with said ratchet means at any stop position on said ratchet means moves said combination presser and mask against said film.

4. A combination film presser and single frame mask device for a microphotographic device having a fixed optical axis, a multiple frame film, separate mechanisms for moving said film horizontally and vertically independently in an image plane of the optical system and ratchet means associated with each of said mechanisms for providing a series of stops corresponding in spacing to the horizontal and vertical dimensions, respectively, of a single frame, that consists in a flat sheet having an aperture centered on the optical axis, the aperture being the size of a single frame, and that is mounted upon a stop means engaged with both of said ratchet means, whereby engagement of said stop means with said ratchet means at any stop position on said ratchet means moves said combination presser and mask against said film.

EVERETT J. COOK.

REFERENCES CITED

The following references are of record in the file of this patent:

UNITED STATES PATENTS

| Number | Name | Date |
| --- | --- | --- |
| 1,882,293 | Mueller | Oct. 11, 1932 |
| 2,019,764 | Ogden | Nov. 5, 1935 |
| 2,106,814 | Romer | Feb. 1, 1938 |
| 2,275,519 | Friederichs | Mar. 10, 1942 |
| 2,369,981 | Reyniers | Feb. 20, 1945 |

FOREIGN PATENTS

| Number | Country | Date |
| --- | --- | --- |
| 469,284 | Great Britain | July 22, 1937 |